United States Patent
Schumacher

(10) Patent No.: US 10,207,535 B2
(45) Date of Patent: Feb. 19, 2019

(54) SELF-CLEANING GEAR ASSEMBLY FOR PENCIL SHARPENERS

(71) Applicant: Elmer's Products, Inc., Atlanta, GA (US)

(72) Inventor: Michael J. Schumacher, Hilliard, OH (US)

(73) Assignee: Sanford, L.P., Atlanta, GA (US)

( * ) Notice: Subject to any disclaimer, the term of this patent is extended or adjusted under 35 U.S.C. 154(b) by 752 days.

(21) Appl. No.: 14/537,508

(22) Filed: Nov. 10, 2014

(65) Prior Publication Data
US 2015/0129086 A1 May 14, 2015

Related U.S. Application Data

(60) Provisional application No. 61/901,782, filed on Nov. 8, 2013.

(51) Int. Cl.
*B43L 23/02* (2006.01)
*B43L 23/00* (2006.01)
*F16H 55/17* (2006.01)

(52) U.S. Cl.
CPC .............. *B43L 23/02* (2013.01); *B43L 23/008* (2013.01); *F16H 55/17* (2013.01); *F16H 2055/176* (2013.01)

(58) Field of Classification Search
CPC ........ B43L 23/00; B43L 23/04; B43L 23/008; B43L 23/02; B43L 23/06; B43L 23/08; B43L 23/085
See application file for complete search history.

(56) References Cited

U.S. PATENT DOCUMENTS

| 2,251,053 | A | * | 7/1941 | Hoffmann | B43L 23/02 144/28.5 |
|---|---|---|---|---|---|
| 5,593,360 | A | * | 1/1997 | Ishida | F16H 1/46 475/331 |
| 6,012,350 | A | * | 1/2000 | Mizuta | B22F 5/08 29/893.34 |
| 6,093,006 | A | * | 7/2000 | Arbocast | F04C 2/102 418/125 |
| 2010/0175788 | A1 | * | 7/2010 | Yeh | B43L 23/06 144/28.72 |
| 2014/0209211 | A1 | * | 7/2014 | Wu | B43L 23/00 144/28.6 |

\* cited by examiner

*Primary Examiner* — Matthew G Katcoff
(74) *Attorney, Agent, or Firm* — Eversheds Sutherland (US) LLP

(57) ABSTRACT

A gear assembly that includes a cutting gear having an outer edge and an inner edge, wherein a plurality of gear teeth is formed on the outer edge thereof; and an internal gear having an outer edge and an inner edge. The internal gear further includes a plurality of gear teeth formed on the inner edge thereof, wherein the gear teeth formed on the inner edge of the internal gear are adapted to engage the gear teeth formed on the outer edge of the cutting gear; a plurality of troughs, wherein each trough in the plurality of troughs is formed between two of the gear teeth formed on the inner edge of the internal gear; and a plurality of debris discharge channels, wherein each debris discharge channel is formed at the bottommost portion of each trough and extends away from the trough toward the outer edge of the internal gear.

17 Claims, 5 Drawing Sheets

SELF-CLEANING GEAR ASSEMBLY FOR PENCIL SHARPENERS

CROSS-REFERENCE TO RELATED APPLICATIONS

This patent application claims the benefit of U.S. Provisional Patent Application Ser. No. 61/901,782 filed on Nov. 8, 2013 and entitled "Self-Cleaning Gear Assembly for Pencil Sharpeners," the disclosure of which is hereby incorporated by reference herein in its entirety and made part of the present U.S. utility patent application for all purposes.

BACKGROUND OF THE INVENTION

The described invention relates in general to sharpening devices and the like, and more specifically to a pencil sharpener that includes a self-cleaning mechanism for automatically removing debris from the gear set that forms a portion of the cutting mechanism of the pencil sharpener.

This invention relates to the fixed internal gear that drives the helical cutter in manual and electric pencil sharpeners by way of the cutter gear, which is attached to one end of the cutter. Because this gear set is most conveniently located adjacent to the pencil cutting area and in the same compartment with the pencil shavings receptacle, it is exposed to wood shavings and ground pencil core debris ("foreign material"). When this debris enters the gear set, it is often pressed into the troughs of the internal gear. If allowed to accumulate, this material can begin to physically obstruct the cutter gear teeth entering into the internal gear teeth, eventually jamming the gear set and preventing further sharpening.

Conventional techniques for addressing this problem include covering the internal gear or adding additional clearance to the gear set. Covers, typically attached to the rotating carrier, are designed to prevent pencil shavings from entering the gear set. These covers are somewhat effective, but it is difficult to completely seal the gear set without increasing the cost or complicating the assembly. Additional clearance has been added to the gears by increasing backlash or reducing (since one of the gears is an internal gear) the center-to-center distance, but this too is only marginally effective. Thus, there is an ongoing need for pencil sharpener that includes a self-cleaning mechanism for automatically removing foreign material from the gears involved in sharpening.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a pencil sharpener is provided. This pencil sharpener includes rotating cutter carrier, wherein the cutter carrier is adapted to receive a pencil for sharpening; a helical cutter mounted on the rotating cutter carrier; and a gear assembly adapted to cooperate with the helical cutter, wherein the gear assembly further includes: cutting gear having an outer edge and an inner edge, wherein a plurality of gear teeth is formed on the outer edge thereof; and an internal gear having an outer edge and an inner edge. The internal gear further includes a plurality of gear teeth formed on the inner edge thereof, wherein the gear teeth formed on the inner edge of the internal gear are adapted to engage the gear teeth formed on the outer edge of the cutting gear; a plurality of troughs, wherein each trough in the plurality of troughs is formed between two of the gear teeth formed on the inner edge of the internal gear; and a plurality of debris discharge channels, wherein each debris discharge channel is formed at the bottommost portion of each trough and extends away from the trough toward the outer edge of the internal gear.

In accordance with another aspect of the present invention, a gear assembly is provided. This gear assembly includes a cutting gear having an outer edge and an inner edge, wherein a plurality of gear teeth is formed on the outer edge thereof; and an internal gear having an outer edge and an inner edge. The internal gear further includes a plurality of gear teeth formed on the inner edge thereof, wherein the gear teeth formed on the inner edge of the internal gear are adapted to engage the gear teeth formed on the outer edge of the cutting gear; a plurality of troughs, wherein each trough in the plurality of troughs is formed between two of the gear teeth formed on the inner edge of the internal gear; and a plurality of debris discharge channels, wherein each debris discharge channel is formed at the bottommost portion of each trough and extends away from the trough toward the outer edge of the internal gear.

In yet another aspect of this invention, an internal gear for use in a sharpening device is provided. This internal gear includes a plurality of gear teeth formed on the inner edge thereof, wherein the gear teeth formed on the inner edge of the internal gear are adapted to engage the gear teeth formed on the outer edge of the cutting gear; a plurality of troughs, wherein each trough in the plurality of troughs is formed between two of the gear teeth formed on the inner edge of the internal gear; and a plurality of debris discharge channels, wherein each debris discharge channel is formed at the bottommost portion of each trough and extends away from the trough toward the outer edge of the internal gear.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

With reference generally to the Figures, the present invention provides a self-cleaning or self-clearing gear assembly that reduces jamming and excessive wear of the cutter gear and internal gear system used in pencil sharpeners and the like due to the accumulation of foreign material such as pencil shavings and core material generated during use of the sharpener. Even when such accumulation doesn't completely jam the gear set, the presence of foreign matter in the gear teeth can cause accelerated wear on the internal gear teeth (which are typically polymeric/plastic for cost reasons, but may also be metal) by abrasion and induced interference.

Figure 1:
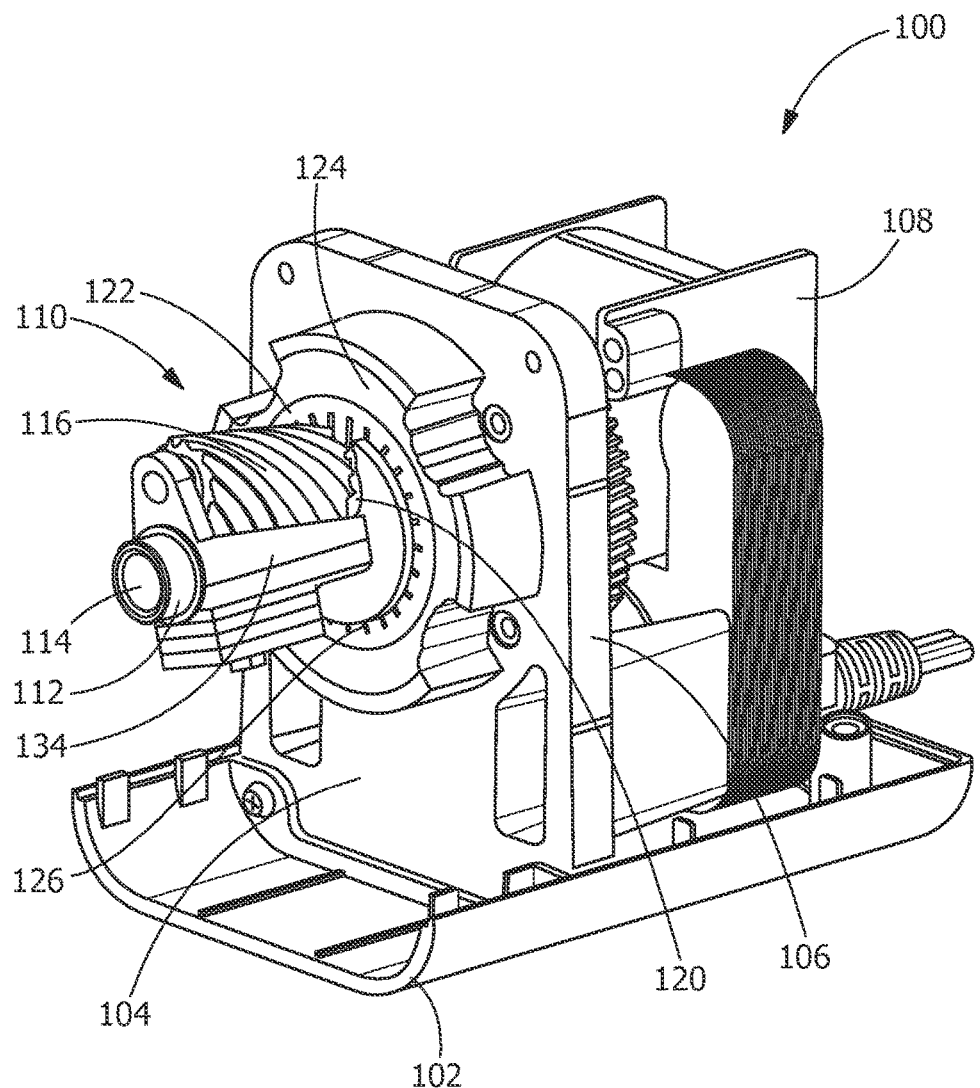
FIG. 1 is a perspective view of a pencil sharpener in accordance with an exemplary embodiment of the present invention.
Figure 2:
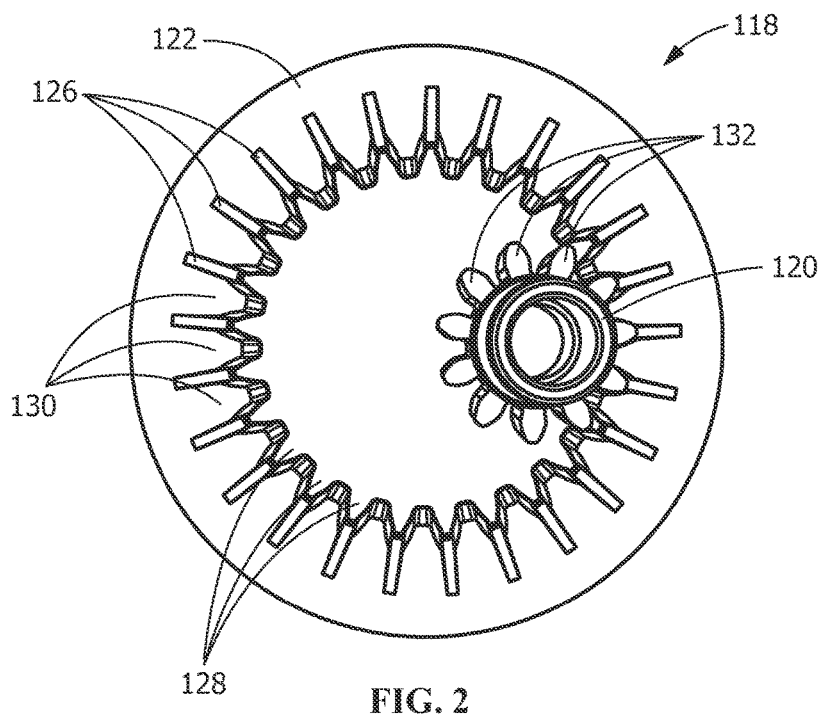
FIG. 2 is a first front perspective view of a gear assembly in accordance with an exemplary embodiment of the present invention.
Figure 3:
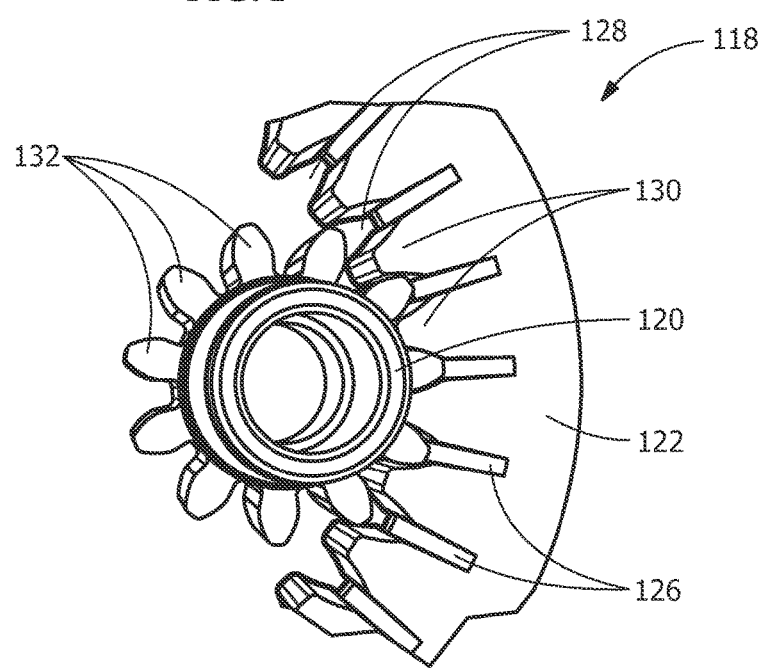
FIG. 3 is a detail of the front perspective view of FIG. 2.
Figure 4:
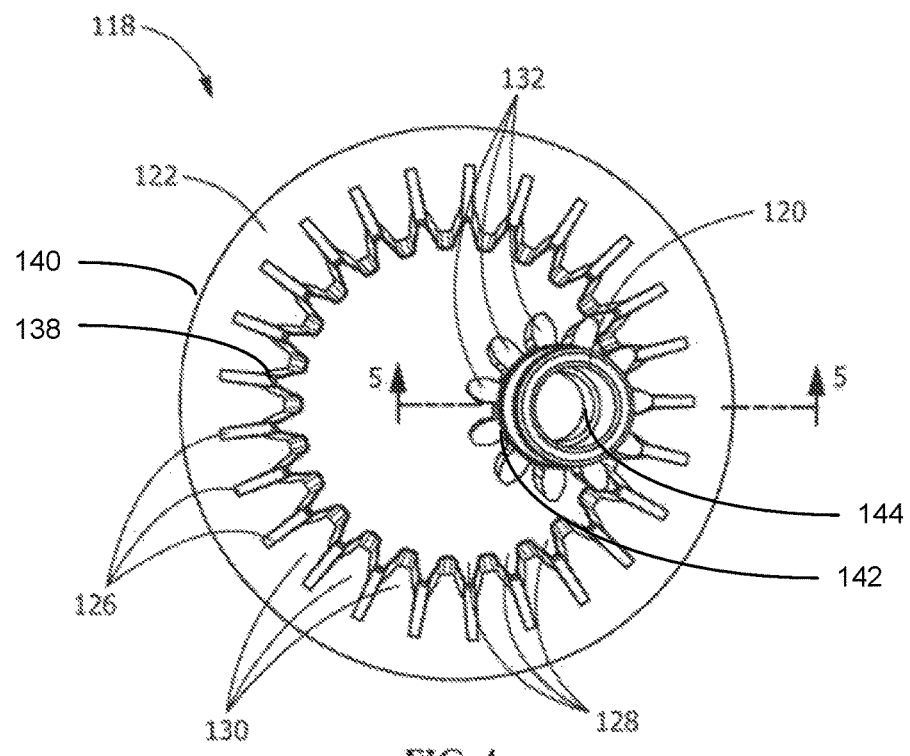
FIG. 4 is a second front perspective view of a gear assembly in accordance with an exemplary embodiment of the present invention.

FIG. 1 provides a perspective view of an electric pencil sharpener 100 in accordance with an exemplary embodiment of the present invention, wherein the covers and/or enclosure has been removed to show the placement and location of internal components. This pencil sharpener 100 includes a substantially horizontal bottom section 102 which supports a receptacle 104 for collecting shavings, and a substantially vertical internal frame and support 106 upon which and to which various other system components are mounted or attached. This pencil sharpener 100 includes a motor 108 and a sharpening assembly 110 that further includes a pencil receiving portion 112 (i.e., rotating cutter carrier 134) having an opening 114 formed therein, a helical cutter 116, and a gear assembly 118. The gear assembly 118 includes cutter gear 120 that is driven by the motor 108 and a fixed internal gear 122 that may be molded into the internal support 124 or that may be a separate component. The cutter gear 120 gear teeth 132 run along the outer edge 142 opposite of the inner edge 144 of the cutter gear 120. As shown in FIGS. 1-9, a rectangular groove 126 or channel is formed at the root or bottommost portion of the trough 128 between each of the gear teeth 130 on the fixed internal gear 122. The internal gear 122 gear teeth 130 run along the inner edge 138 opposite of the outer edge 140 of the internal gear 122. The embodiments depicted in the Figures include 25 of these grooves 126, although the total number of grooves 126 may differ in alternate embodiments. When the cutter gear 120 engages the internal gear 122, the action and motion of the cutter gear 120 causes any foreign material (e.g., wood or paper shavings from a pencil or crayon) that may accumulate between the teeth 130 of the internal gear 122 during sharpening to be discharged or cleared from the internal gear 122 by way of the grooves 126.

Figure 5:
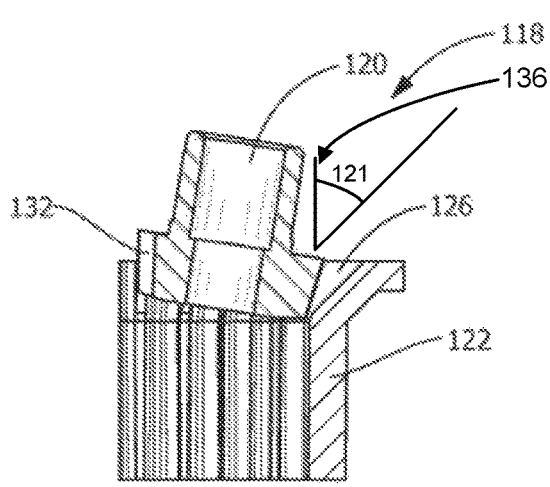
FIG. 5 is a cross-sectional view taken along line 5-5 of the gear assembly of FIG. 4.
Figure 6:
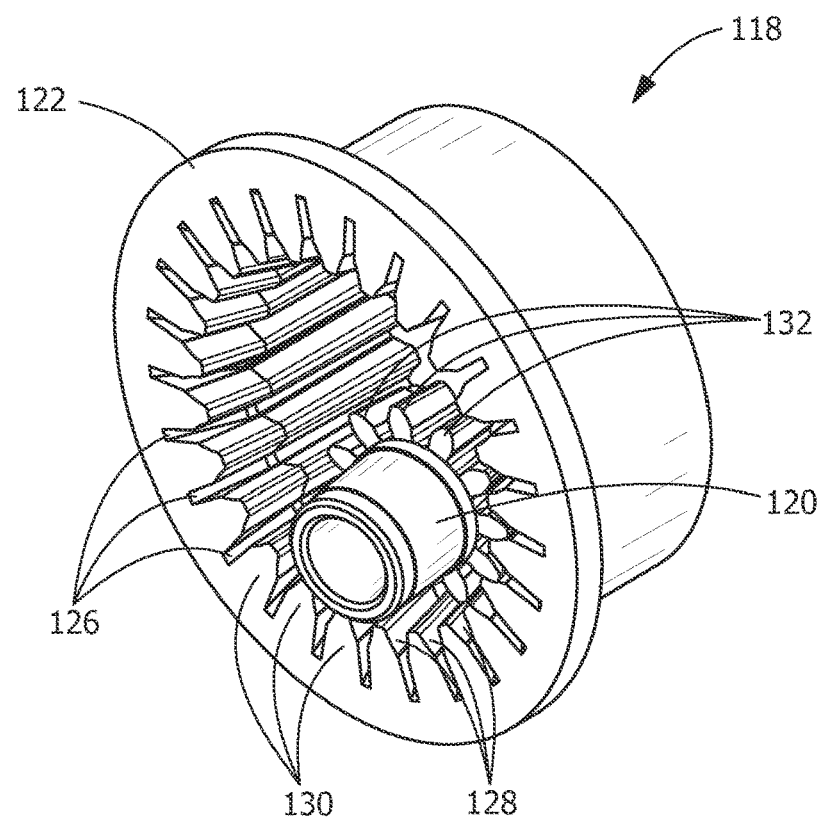
FIG. 6 is a third perspective view of a gear assembly in accordance with an exemplary embodiment of the present invention.
Figure 7:
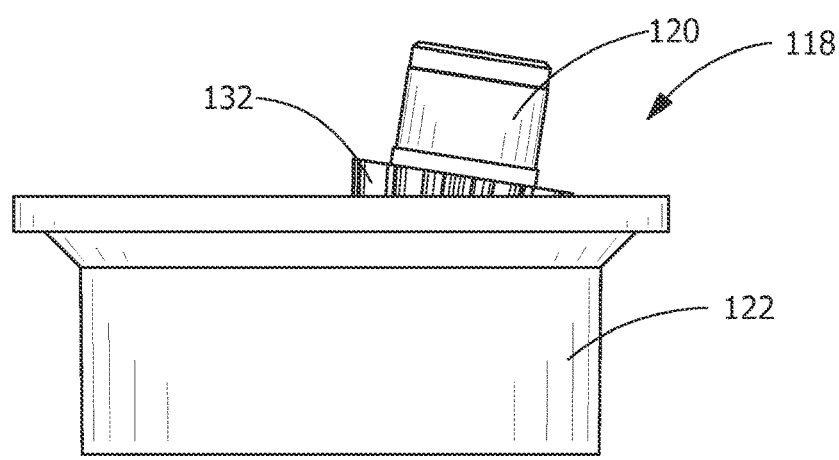
FIG. 7 is a side view of the gear assembly of FIG. 6.
Figure 8:
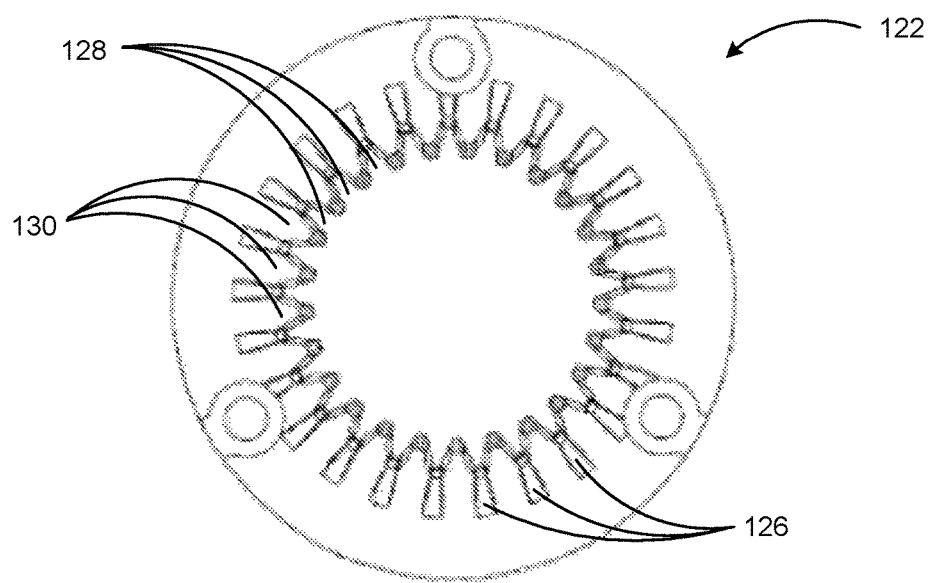
FIG. 8 is a front view of an internal gear in accordance with an alternate embodiment of the present invention, wherein the shape of the grooves broaden after passing through the internal gear tooth profile.
Figure 9:
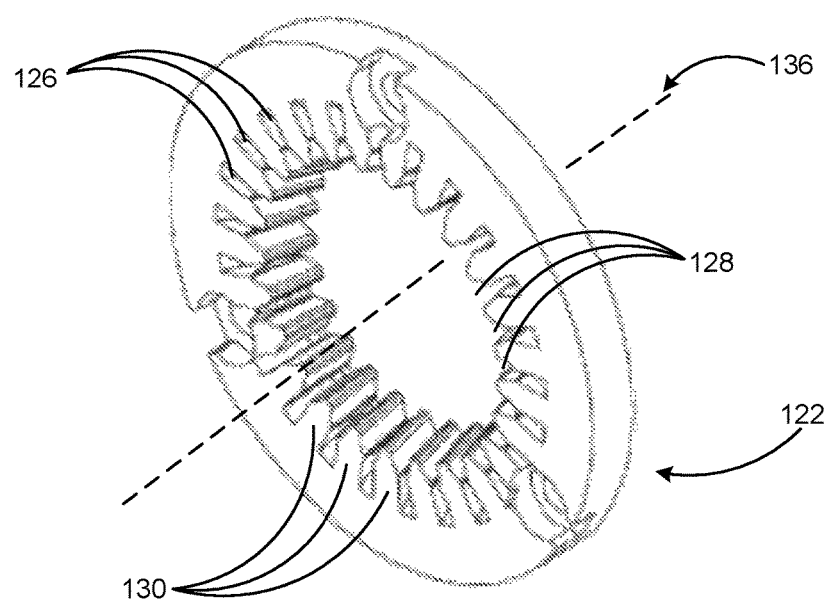
FIG. 9 is a perspective view of the internal gear of FIG. 8.

As shown in FIG. 5, the discharge grooves or channels 126 may be angled at about 45° (or at another suitable angle 121) from the longitudinal axis 136 of the internal gear 122 for discharging debris in a forward direction and into the shavings receptacle 104. In other embodiments, the grooves 126 are not significantly angled. In still other embodiments, the grooves or channels 126 pass completely through the internal gear 122 and debris is discharged in a rearward direction and/or in a forward direction. In the embodiment shown in FIGS. 8-9, the grooves 126 on the internal gear 122 broaden after passing through the gear teeth 130 so that once shavings pass through the neck of the gear profile (i.e., troughs 128), they are more freely discharged into the shavings receptacle 104. These grooves or channels 126 are intended for inclusion on the internal gear 122 and some embodiments on the mating cutter gear 120 of pencil sharpeners 100. In some embodiments, the internal gear 122 is a molded plastic component that cooperates with other molded internal components and in other embodiments, the internal gear 122 is a separate part die-cast from zinc or other metal(s). Generally, debris accumulation does not affect the cutter gear 120 as much as the internal gear 122 because its higher rotational velocity tends to throw off foreign material or debris; however, there may be a benefit for use with sticky colored pencil core materials that can cling to the cutter gear 120. This design may also be suitable for other applications, especially in the proximity of cutting operations, where scraps of foreign material may be present.

With the present invention, it is also desirable for both the internal gear teeth 130 and cutter gear teeth 132 to be open on both sides (i.e., no internal corners at the troughs 128 of the gears 120 and 122). Internal corners are sometimes caused by flanges added to the cutter side of the cutter gear 120, and on the internal gear 122 by molding teeth into an existing structural component of the sharpener to just beyond the gear design width. Additionally, this improvement is envisioned in conjunction with a bevel gear design (see FIG. 5) for the fixed internal gear 122 and cutter gears 120. Traditionally, these gears 120 and 122 were spur gears and the angular misalignment was neglected for the individual gear design. Only the center distance, tip radius of the cutter gear teeth 132, and the internal gear 122 inside diameter were modified to provide additional clearance to eliminate the interference due to the angular misalignment.

Some embodiments of this invention include a "wiper" in the form of a finger, arm, bar, extension, or similar structure extending from the rotating cutter carrier 134 that helps to clear shavings that begin to align and protrude from the grooves as the shavings are being ejected.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A pencil sharpener, comprising;
 a rotating cutter carrier, wherein the cutter carrier is adapted to receive pencil for sharpening;
 a helical cutter mounted on the rotating cutter carrier;

a gear assembly adapted to cooperate with the helical cutter, the gear assembly comprising:
  a cutter gear having an outer edge and an inner edge, and comprising a plurality of gear teeth on the outer edge thereof; and
  an internal gear having an outer edge and an inner edge, and comprising:
    a plurality of gear teeth on the inner edge thereof, wherein the gear teeth on the inner edge of the internal gear are adapted to engage the gear teeth on the outer edge of the cutter gear;
    a plurality of troughs, wherein each trough in the plurality of troughs is formed between two of the gear teeth on the inner edge of the internal gear, wherein each trough is configured to receive one of the plurality of gear teeth of the cutter gear, such that a tip of one of the gear teeth of the cutter gear extends to a bottommost portion of each trough; and
    a plurality of debris discharge grooves, wherein each debris discharge groove is in communication with one of the plurality of troughs and extends from the bottommost portion of the trough toward the outer edge of the internal gear, without extending through the outer edge of the internal gear,
    wherein each of the plurality of debris discharge grooves increases in width as the debris discharge grooves extend toward the outer edge of the internal gear.

2. The pencil sharpener of claim 1, wherein the internal gear is a molded plastic component.

3. The pencil sharpener of claim 1, wherein the internal gear is a die-cast metal component.

4. The pencil sharpener of claim 1, wherein the debris discharge grooves are angled outwardly at about 45 degrees from the longitudinal axis of the internal gear for discharging debris in a forward direction.

5. The pencil sharpener of claim 1, wherein the internal gear comprises a first surface extending between the inner edge and the outer edge perpendicular to the longitudinal axis of the internal gear, and wherein the plurality of debris discharge grooves extend to the first surface.

6. A gear assembly for use in a sharpening device, comprising:
  a cutter gear having an outer edge and an inner edge, and comprising a plurality of gear teeth on the outer edge thereof; and
  an internal gear having an outer edge and an inner edge, and comprising:
    a plurality of gear teeth on the inner edge thereof, wherein the gear teeth on the inner edge of the internal gear are adapted to engage the gear teeth on the outer edge of the cutter gear;
    a plurality of troughs, wherein each trough in the plurality of troughs is formed between two of the gear teeth on the inner edge of the internal gear where each trough is configured to receive one of the plurality of gear teeth of the cutter gear, such that a tip of one of the gear teeth of the cutter gear extends to a bottommost portion of each trough; and
    a plurality of debris discharge grooves, wherein each debris discharge groove is in communication with one of the plurality of troughs and extends from the bottommost portion of the trough toward the outer edge of the internal gear, without extending through the outer edge of the internal gear, wherein each of the plurality of debris discharge grooves increases in width as the debris discharge grooves extend toward the outer edge of the internal gear.

7. A pencil sharpener comprising the gear assembly of claim 6.

8. The gear assembly of claim 6, wherein the internal gear is a molded plastic component.

9. The gear assembly of claim 6, wherein the internal gear is a die-cast metal component.

10. The gear assembly of claim 6, wherein the debris discharge grooves are angled outwardly at about 45 degrees from the longitudinal axis of the internal gear for discharging debris in a forward direction.

11. The gear assembly of claim 6, wherein the internal gear comprises a first surface extending between the inner edge and the outer edge perpendicular to the longitudinal axis of the internal gear wherein the plurality of debris discharge grooves extend to the first surface.

12. An internal gear for use in a sharpening device, wherein the internal gear has an outer edge and an inner edge and further comprising:
  a plurality of gear teeth on the inner edge thereof, wherein the gear teeth on the inner edge of the internal gear are adapted to engage gear teeth on an outer edge of a cutter gear;
  a plurality of troughs, wherein each trough in the plurality of troughs is formed between two of the gear teeth on the inner edge of the internal gear, wherein each trough is configured to receive one of the plurality of gear teeth of the cutter gear, such that a tip of one of the plurality of gear teeth of the cutter gear extends to a bottommost portion of each trough; and
  a plurality of debris discharge grooves, wherein each debris discharge groove is in communication with one of the plurality of troughs and extends from the bottommost portion of the trough toward the outer edge of the internal gear, without extending through the outer edge of the internal gear,
  wherein each of the plurality of debris discharge grooves increases in width as the debris discharge grooves extend toward the outer edge of the internal gear.

13. A pencil sharpener comprising the internal gear of claim 12.

14. The internal gear of claim 12, wherein the internal gear is a molded plastic component.

15. The internal gear of claim 12, wherein the internal gear is a die-cast metal component.

16. The internal gear of claim 12, wherein the debris discharge grooves are angled outwardly at about 45 degrees from the longitudinal axis of the internal gear for discharging debris in a forward direction.

17. The internal gear of claim 12, wherein the internal gear comprises a first surface extending between the inner edge and the outer edge perpendicular to the longitudinal axis of the internal gear, and wherein the plurality of debris discharge grooves extend to the first surface.

* * * * *